(12) United States Patent
Samaniego et al.

(10) Patent No.: US 12,078,718 B2
(45) Date of Patent: Sep. 3, 2024

(54) GENERATING ISAR IMAGES WITH DISTINGUISHABLE FEATURES

(71) Applicant: Raytheon Company, Tewksbury, MA (US)

(72) Inventors: Raymond Samaniego, Prosper, TX (US); John R. Goulding, Farmersville, TX (US)

(73) Assignee: Raytheon Company, Tewksbury, MA (US)

( * ) Notice: Subject to any disclaimer, the term of this patent is extended or adjusted under 35 U.S.C. 154(b) by 175 days.

(21) Appl. No.: 17/674,530

(22) Filed: Feb. 17, 2022

(65) Prior Publication Data

US 2023/0258796 A1 Aug. 17, 2023

(51) Int. Cl.
*G01S 13/90* (2006.01)

(52) U.S. Cl.
CPC ...... *G01S 13/9064* (2019.05); *G01S 13/9027* (2019.05)

(58) Field of Classification Search
CPC .......................... G01S 13/9064; G01S 13/9027
See application file for complete search history.

(56) References Cited

U.S. PATENT DOCUMENTS

| | | | | |
|---|---|---|---|---|
| 4,924,229 A | * | 5/1990 | Eichel | G01S 13/9017 342/25 E |
| 5,250,952 A | * | 10/1993 | Roth | G01S 13/904 342/25 F |
| 2005/0104763 A1 | * | 5/2005 | Hall | G01S 13/90 342/25 A |

* cited by examiner

*Primary Examiner* — Peter M Bythrow
*Assistant Examiner* — Nazra Nur Waheed
(74) *Attorney, Agent, or Firm* — Schwegman Lundberg & Woessner, P.A.

(57) ABSTRACT

Devices, systems, and methods for removing non-linearities in an inverse synthetic aperture radar (ISAR) image are provided. A method includes estimating pitch and roll about range and doppler axes of a time series of ISAR images including the ISAR image, interpolating ISAR image data based on the estimated pitch and roll resulting in interpolated ISAR image data, and resampling based on the interpolated ISAR image data and the time series of TSAR images resulting in an enhanced image.

18 Claims, 11 Drawing Sheets

GENERATING ISAR IMAGES WITH DISTINGUISHABLE FEATURES

TECHNICAL FIELD

Embodiments discussed herein regard devices, systems, and methods for automated feature extraction and labelling and object feature map generation.

BACKGROUND

An automatic target recognizer (ATR) is a real-time or near-real-time image or signal processing system. An ATR typically receives an input stream of data and outputs a list of targets that it has detected and recognized from the input stream of data. An ATR system can perform other functions such as image stabilization, preprocessing, mosaicking, target tracking, activity recognition, multi-sensor fusion, common operating picture, sensor and platform control, and data organizing for transmission or display. ATR input data can be in the form of non-imaging one-dimensional (1D) sensor returns, such as ultra-high range-resolution (HRR) radar returns for air-to-air automatic target recognition or vibration signatures from a laser radar for recognition of ground targets. ATR data can have two-dimensional (2D) images that fall into three general views: perspective, plan, and profile. Typical 2D images for ATR are infrared and synthetic aperture radar (SAR) images. ATR input data can be three-dimensional (3D), such as those from sequences of multiple exposures taken over time from a non-stationary position. As a target moves, so do sensors, and that movement can be exploited by an ATR. Hyperspectral data, which are views of the same scene looking in different spectral bands, is another approach to obtaining multiple image data where the third dimension is wavelength. Many inverse synthetic aperture radar (ISAR) images lack detail due to low integration times limited by target rotational acceleration. Lack of information on the location of masts and superstructures limits the ability of any classification method to accurately select the correct target.

Automated target recognition classification identifies to which class of a set of classes, a real observation belongs. This classification is made on the basis of a training set of data containing observations (real or modeled) whose class membership is known. One known technique is a support vector machine (SVM) classifier. SVMs have already been applied in other radar target recognition problems for ground, air, and maritime targets. The support-vector is a learning machine for two-group classification problems. In a non-linearly mapped high-dimension feature space, a linear decision surface is then constructed, and subsequent observations are classified according to the linear decision surface.

There are many types of surface ships, both commercial and naval combatants. In general, naval ships are bulkier than merchant ships, having flowing lines and usually less deckhouse and superstructure. Most ships can be characterized by a small well-defined set of features that are linearly arranged in some unique pattern along the length of the ship. This portion of the problem is therefore most amenable to a model-based approach, where a ship is modeled in terms of a unique pattern of high-level features.

Prior art in maritime ATR includes using LOA estimation and at least one statistically significant point of interest, such as a mast location. A Naval database study and subsequent 2011 ATR working group meeting at Sandia National Laboratories investigated the number of ship class confusors versus ship length overall (LOA). The study found that using only LOA resulted in up to 64 ship class confusors for 60-meter (+/−5 meters) ship lengths. Between 30 and 170 meters, there are at least 10 ship class confusors per ship length +/−5 meters. The authors found that adding additional measured features, such as the number of ship structures, the positions of maximum height features, and position and width of super structures, could be used to reduce the number of ship class confusors. Using a ship silhouette profile reduced the maximum number of class confusors to 9 for 60-meter (+/−5 meters) ship lengths, and about 2-3 confusors between 30 and 170 meters per ship length +/−5 meters.

Acceleration model-based methods have been used to increase the integration time of ISAR targets. These methods use target acceleration measurements along with a motion model to better focus longer integration time collections. However, the limit on how long these methods allow one to integrate has limited the effectiveness of enhancing target features and improving the classification with respect to conventional ISAR. Other methods involve an affine transform across sub-apertures. However, these methods manual selection of tie points prior to affine application.

DETAILED DESCRIPTION

The application, in various aspects, addresses deficiencies associated with inverse synthetic aperture radar (ISAR) imagery. Embodiments include systems, device, machine-readable media, and method for increasing an integration time, along with a way of identifying masts and superstructures on images that are not oriented in a profile view.

Embodiments extend ISAR integration times to times that approach that of SAR aperture times. This provides a high-resolution plan view (deck view) of the ISAR target. In addition, exploitation of acceleration residuals after focusing the target have shown to increase knowledge of the location of masts and superstructures. This information can be used in a machine earning (ML) algorithm to generate more accurate target classification than previous attempts.

Embodiment can use an iterative and dynamic tiling of an image to extract phase errors between consecutive ISAR images. Embodiments can use a data driven resampling of raw data to allow rotational corrections and longer integration times. The resampling function can be derived from the tiled phase error measurements. Exploitation of final non-linear phase residuals can be used to identify mast and superstructure locations. Definition and exploitation of the enhanced features can be performed by an ML technique.

Figure 1:
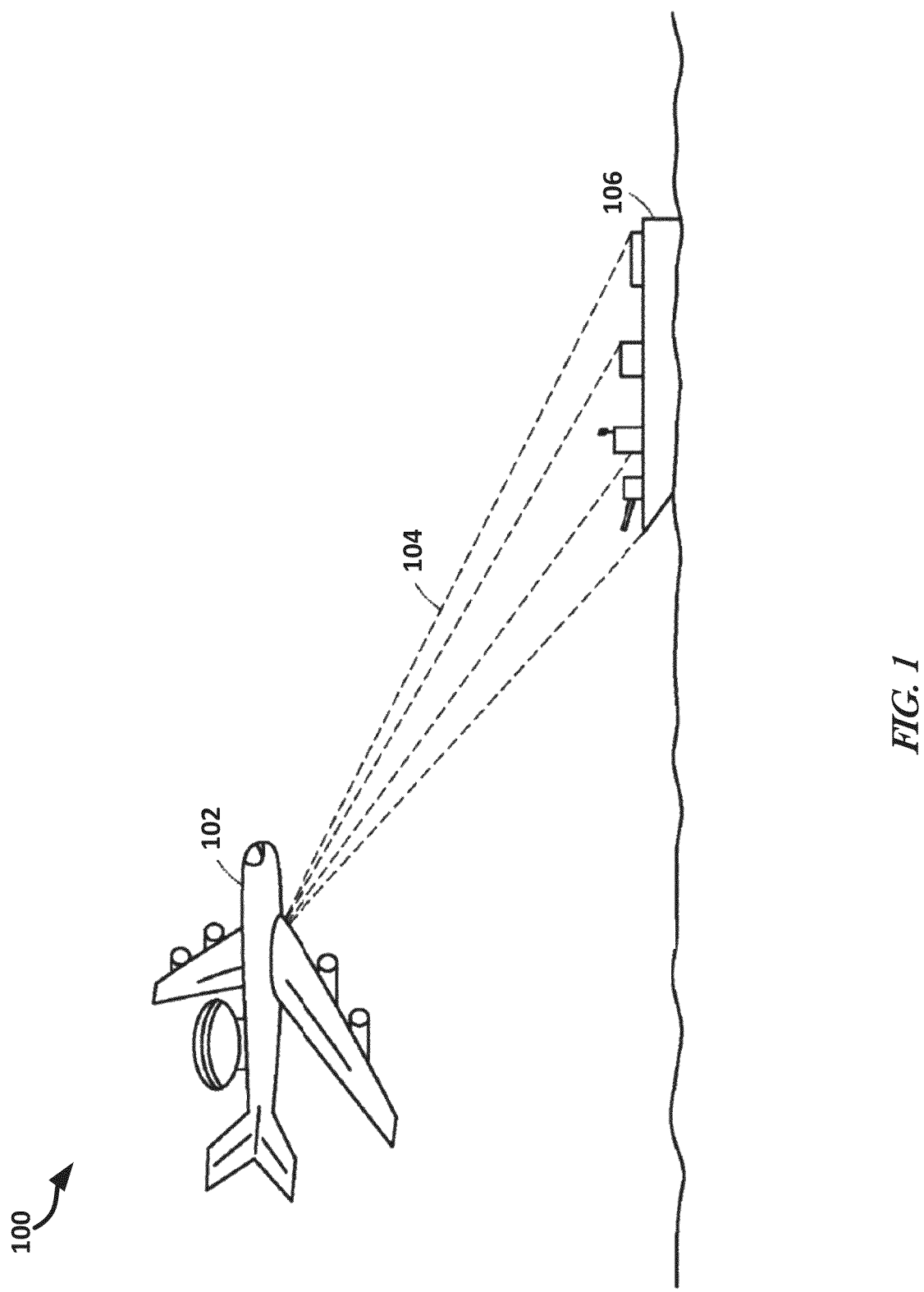
FIG. 1 is a view of an aircraft using a radar system to capture image data associated with a target naval vessel.

FIG. 1 is a view 100 of an aircraft 102 using a radar system to capture image data associated with a target naval vessel 106. The view 100 shows aircraft 102 emitting radar beams 104 from an antenna to illuminate the vessel 106, which enables aircraft 102 to capture radar pulses echoed back toward the aircraft 102 as it moves through the air. As the antenna location changes with respect to time, a radar system in aircraft 102, which may be a an ISAR, combines recordings at multiple positions of the aircraft 102 and its antenna to form a synthetic antenna aperture. This allows the radar system to generate high-resolution images and/or data of the target vessel 106 using a relatively small antenna.

Aircraft 102 may have an ATR system that receives raw target data and/or target images from a radar system of aircraft 102. The aircraft 102 may have an image acquisition system that receives data from a radar receiver, processes the data into images, and provides the images of vessel 106 to the ATR. The aircraft 102 may send its raw or processed target and/or image data to other land, sea, or air entities. For example, aircraft 102 may be communicatively linked with other aircrafts, vessels, or facilities via a system that enables aircraft 102 to transmit target data and/or images to a remote ATR system at another entity connected to the system. The aircraft 102 may also operate bi-statically to receive radar pulses from another aircraft, or ground transmitter.

While FIG. 1 explains embodiments in terms of ISAR on an aircraft, embodiments are also applicable to laser detection and ranging (LADAR), sound detection and ranging (SONAR), multi-spectral imaging, or the like. The images can be provided by a sensor (e.g., ISAR, SAR, LADAR, SONAR, electro-optical/infrared (EO/IR), or the like) on a platform (e.g., manned, or unmanned aircraft, satellite, balloon, ship, ground vehicle, submarine, or the like).

Figure 2:
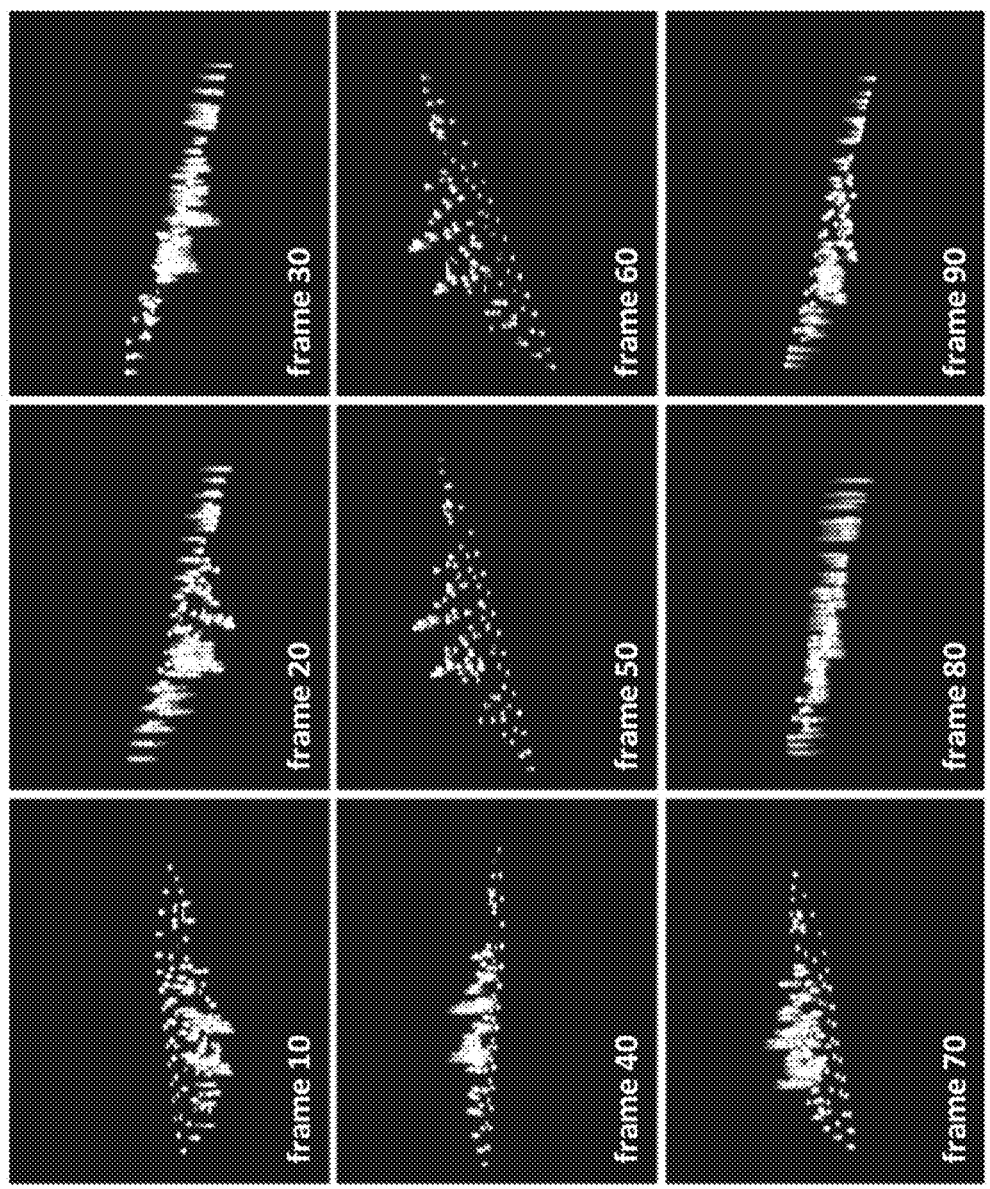
FIG. 2 illustrates, by way of example, a time sequence of processed ISAR images of a same object.

FIG. 2 illustrates, by way of example, a time sequence of processed ISAR images 200 of a same object. The images include range along the x-axis and Doppler along the y-axis. ISAR uses six degrees of freedom (DoF) motion of the target to form range/Doppler imagery. The six DoF include roll, pitch, yaw, heave, sway, and surge. Periodic target motion causes ISAR image utility (in terms of usefulness for ML models and human analysts) to vary. For example, for a ship in an environment of sea state 3, a motion period is on the order of 9 seconds and for sea state 0, the motion period is on the order of 90 seconds. The ISAR images 200 are for a ship in sea state 0. As can be seen, some of the images provide detail sufficient for a human identifying parts of the ship (e.g., frames 40, 50, 60, and 70), while other of the images provide insufficient detail for a human identifying parts of the ship (e.g., frames 30 and 80). This means that only some of the ISAR images generated in this motion period could be labelled manually by a human to be used for ML classification while others could not be labelled manually. For example, frames 30 and 80 of the images 200 can be particularly difficult for a human to label.

Figure 3:
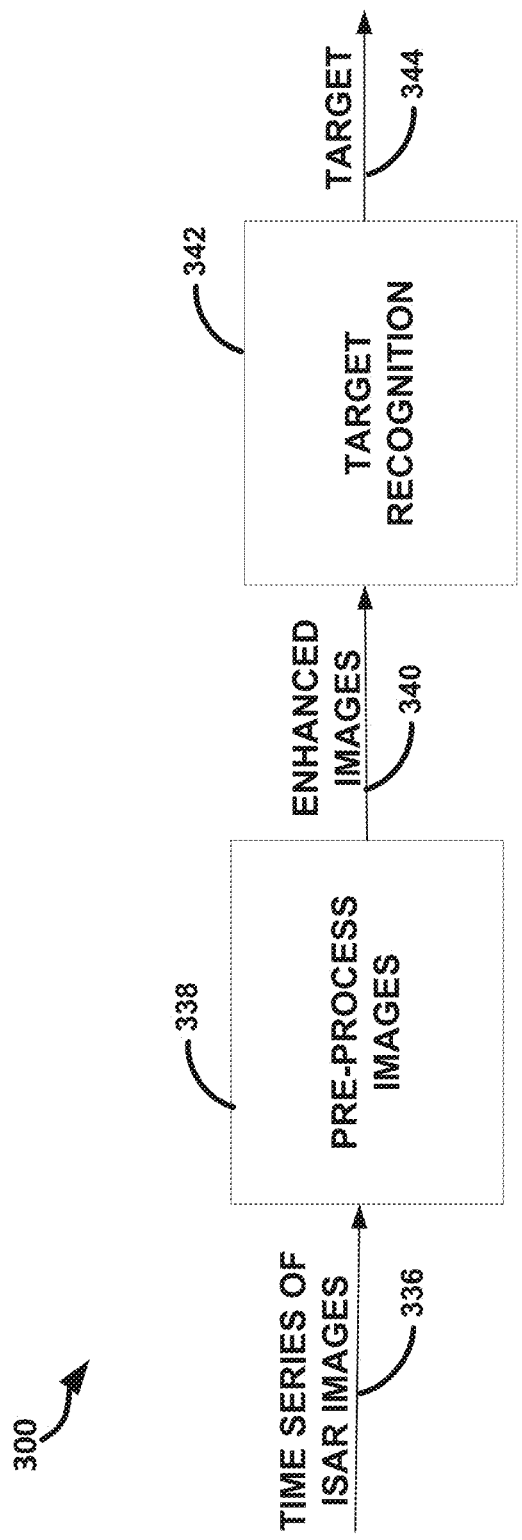
FIG. 3 illustrates, by way of example, a block diagram of an embodiment of a system for target recognition.

FIG. 3 illustrates, by way of example, a block diagram of an embodiment of a system 300 for target recognition. The system 300 includes a time series of ISAR images 336, a pre-process images operation 338 that generates enhanced images 340, and a target recognition operation 342 that generates data indicating one or more targets 344 in the enhanced image 340.

The time series of images 336 are from an ISAR. The time series of images 336 are consecutive images, in time, from the ISAR. The images 336 can be of objects that are distinguishable based on feature presence. Each of the images in the time series of images 336 can be, for example maritime objects.

At operation 338, the images 336 can be pre-processed. The operation can include image enhancement, segmenting object pixels (e.g., cropping in range), or the like. The operation 338 can be performed automatically, such as based on metadata of a given image. The operation 338 can include interpolating and re-sampling image data The metadata can include information regarding the distance between the object and the sensor (e.g., the radar) that generated the image, an orientation of the sensor, a location of the sensor, or the like.

Figure 4:
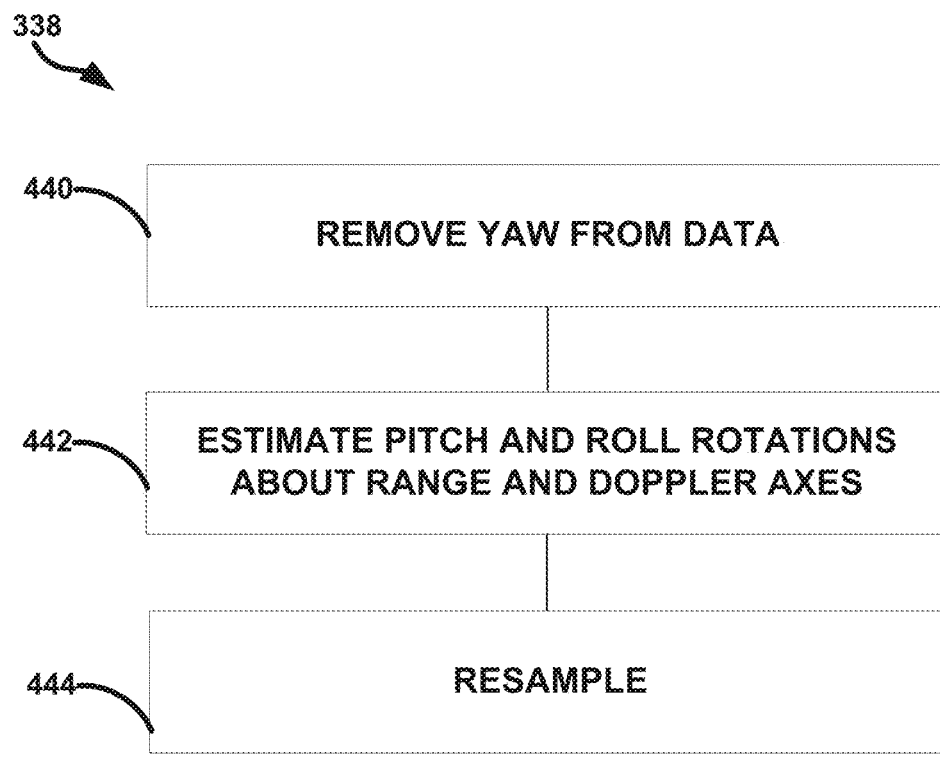
FIG. 4 illustrates, by way of example, a diagram of an embodiment of the operation.

FIG. 4 illustrates, by way of example, a diagram of an embodiment of the operation 338. The operation 338 as illustrated includes removing yaw between consecutive images, at operation 440. The operation 338 can include performing a polar format algorithm (PFA) on the data from the sensor. The result of the operation 440 is an ISAR image with the yaw removed. Basic ISAR phase history data is collected in a polar coordinate frame of the frequency space of the image, and if operation 440 is not performed there are unwanted limitations to further processing. The PFA is widely known and used.

The operation 338 as illustrated further includes estimating pitch and roll rotations about range and doppler axes, at operation 442. See FIG. 5 for more details regarding how to estimate pitch and roll rotations about the range and doppler axes. The operation 442 can be used to inform an interpolation function that is used at operation 444. The operation 444 can include resampling based on the interpolated data and the data from operation 440.

Figure 5:
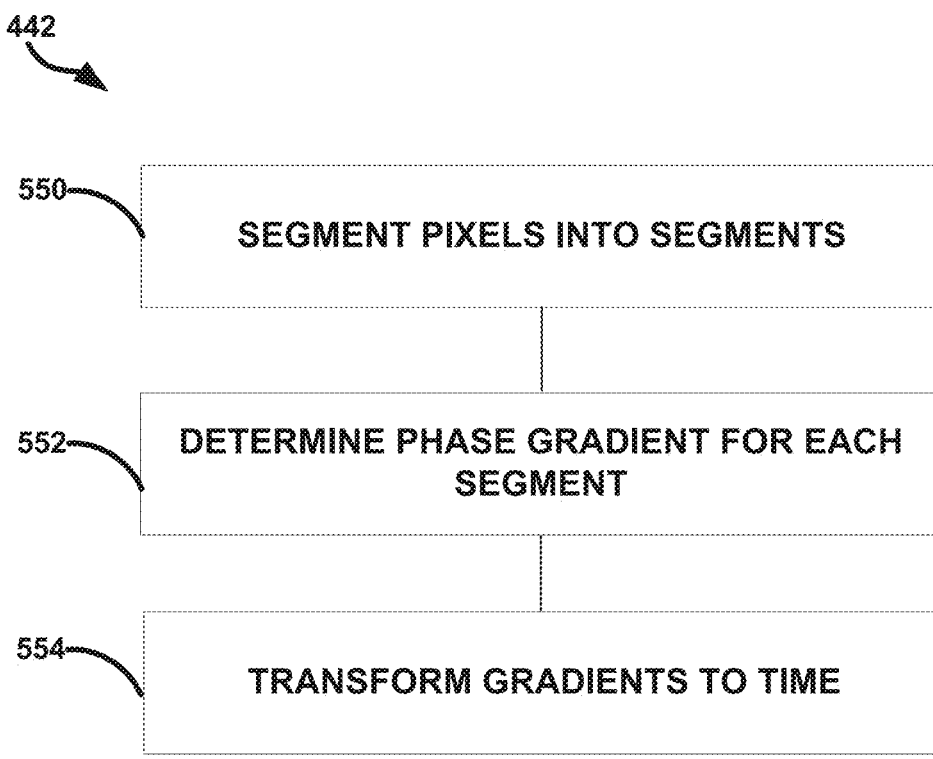
FIG. 5 illustrates, by way of example, a diagram of an embodiment of the operation.

FIG. 5 illustrates, by way of example, a diagram of an embodiment of the operation 442. The operation 442 as illustrated includes segmenting pixels of the ISAR image into segments, at operation 550, determining a phase gradient for each segment, at operation 552; and transforming the gradients to time, at operation 554. The operation 550 can include separating the pixels into subsets of pixels. Each of the subsets of pixels can span a specified number of rows and columns of pixels. The specified number of rows and columns can be determined to reduce an amount of blur in the images 336. A number of rows and columns (sometimes called a size of a segment) can be selected and the phase between images can be determined. The number of rows and columns can be iterated (reduced by a specified amount) and the phase between images can be determined again. This process can be repeated until an error (e.g., a root mean square (RMS) or other error) in phase measurements between consecutive images differs by less than a specified amount.

The operation 552 can include determining the difference ("gradient") between phase measurements for each segment. The operation 554 can include determining a time for samples based on the determined gradients. The time, $t_s(n)$, can be determined based on one or more of a time, $t_s(n-1)$ of an immediately prior iteration, a doppler center, $f_d$, of the sensor (this can be specified in metadata), a distance to the object, $f_0$, a pulse repetition interval (PRI), the determined phase gradient, $\Delta\varphi$, or the pulse repetition frequency (PRF). The $t_s$ can be determined for each segment. The $t_s$ for each segment of an image can be averaged and used as $t_s(n-1)$ for a next iteration of performing the operation 444. Equation 1 converts the phase gradients to time:

$$t_s(n) = t_s(n-1) + \frac{f_d - f_0}{\frac{\Delta\varphi * PRF}{2\pi} + f_d - f_0} * PRI \qquad \text{Equation 1}$$

The operation 444 includes resampling based on interpolated data (output from operation 554) and the data from operation 440. A flow diagram depiction that provides an overview of the operation 338 is provided in FIG. 6.

Figure 6:
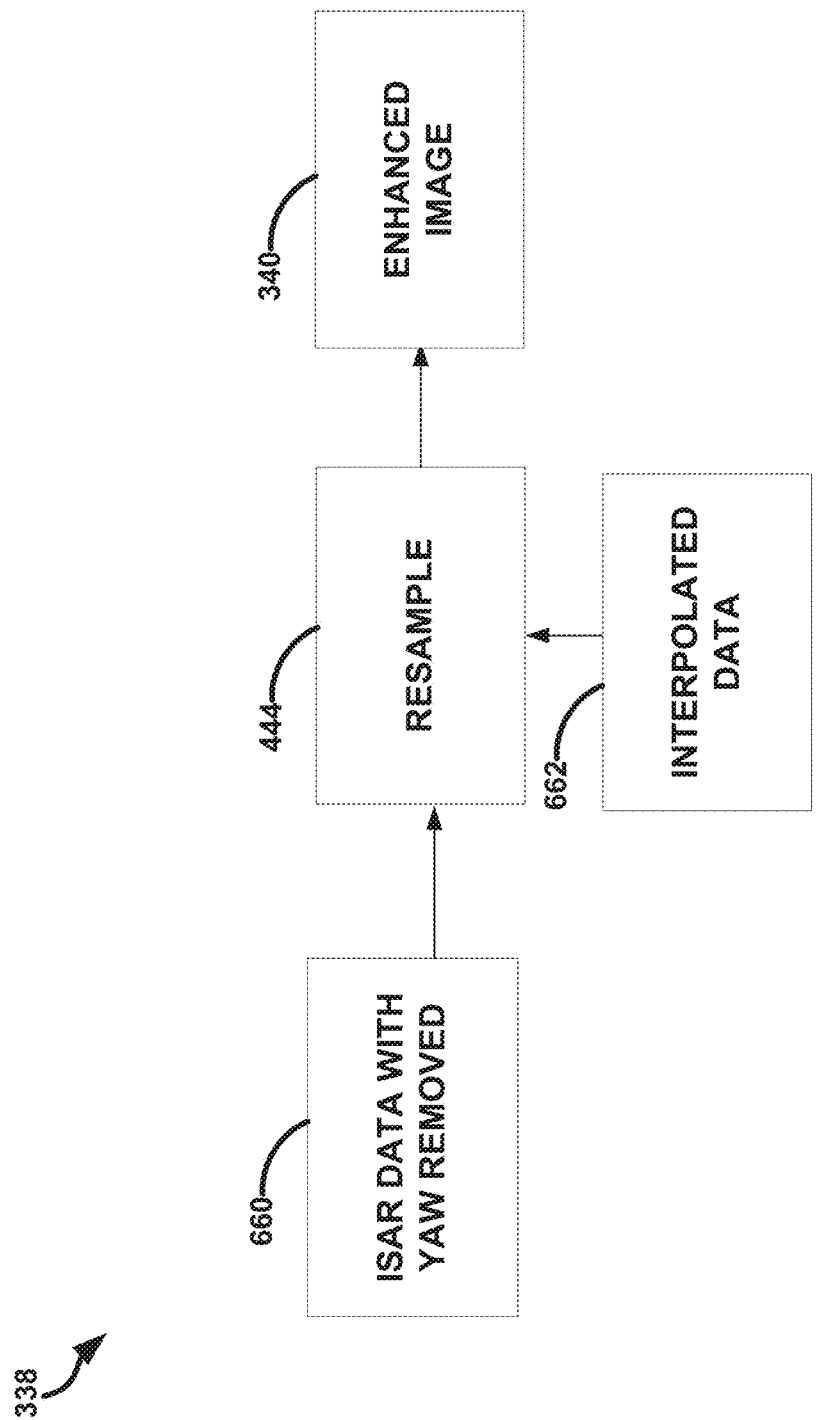
FIG. 6 illustrates, by way of example, a flow diagram of a portion of the method.

FIG. 6 illustrates, by way of example, a flow diagram of a portion of the operation 338. The operation 338 as illustrated includes receiving (from the operation 440) ISAR data 660 with yaw removed therefrom. As discussed previously, PFA can be performed on the ISAR data to remove yaw therefrom. The operation 338 further includes providing interpolated data 662 to the resample operation 444. The interpolation operation that operates in accord with Equation 1 is not linear. The interpolated data 662 is produced as a result of operation 442. The operation 444 can remove non-linearities from the raw data by resampling based on the interpolated data 662 and the ISR data 660 with yaw removed. The operation 444 resamples the entire image to generate the enhanced image 340. The non-linearities defocus the radar image, so removing the non-linearities helps focus the radar image.

There are some relationships between interpolation and resampling. Resampling changes a sample rate of a set of samples. In the case of an image, these are the pixel values sampled at each pixel coordinate in the image. Resampling is used to either increase the sample rate (make the image larger) or decrease it (make the image smaller). Interpolation is the process of calculating values between sample points (pixels in the example of an image). Interpolated samples can be used in a resampled image.

Figure 7:
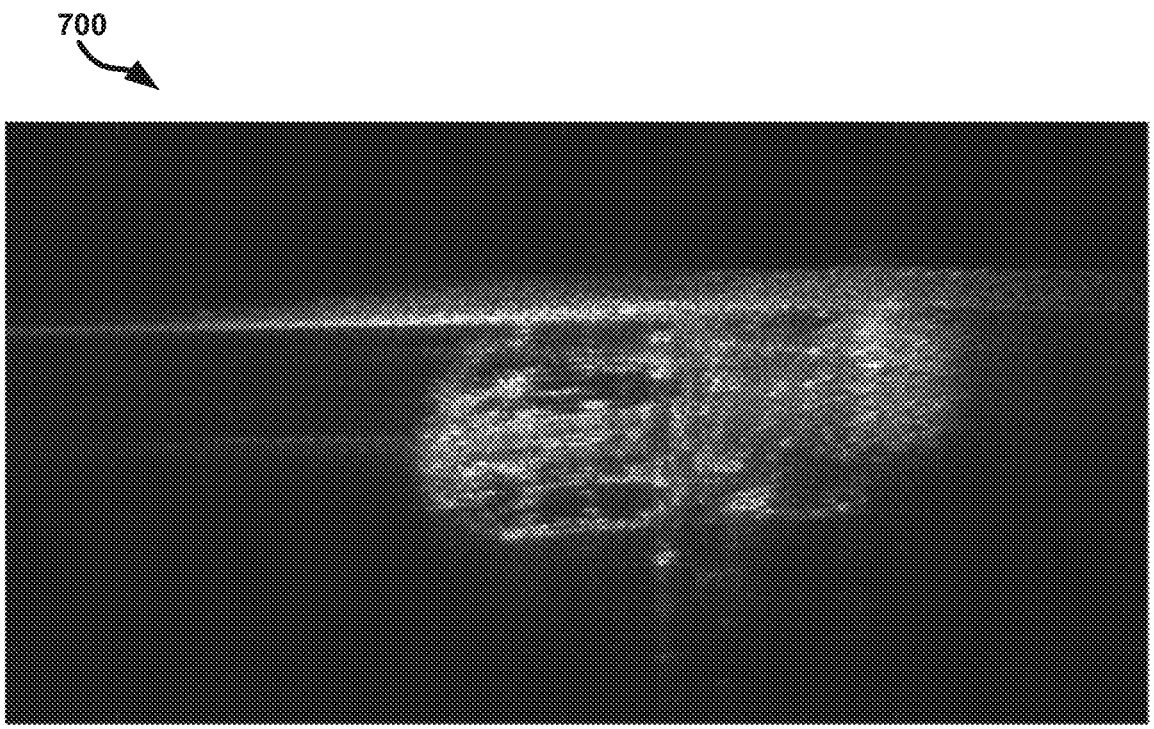
FIG. 7, FIG. 8, FIG. 9, and FIG. 10 illustrate respective images at different times that result from performing the method 338.
Figure 8:
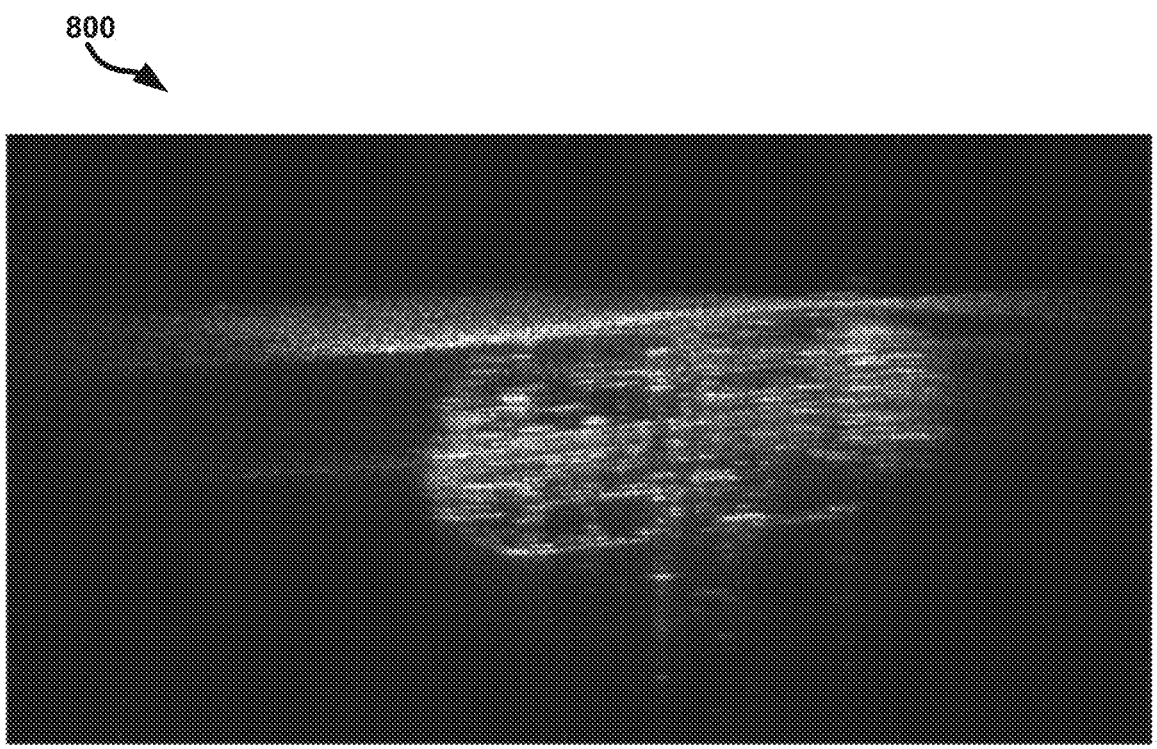
Figure 9:
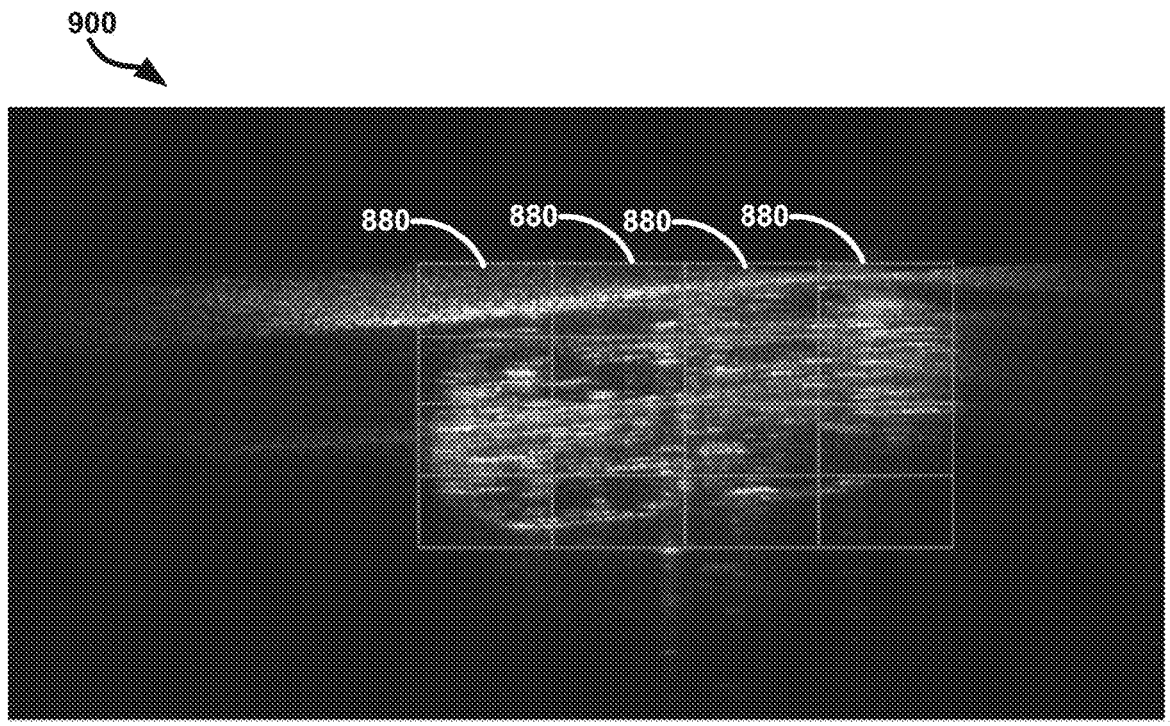
Figure 10:
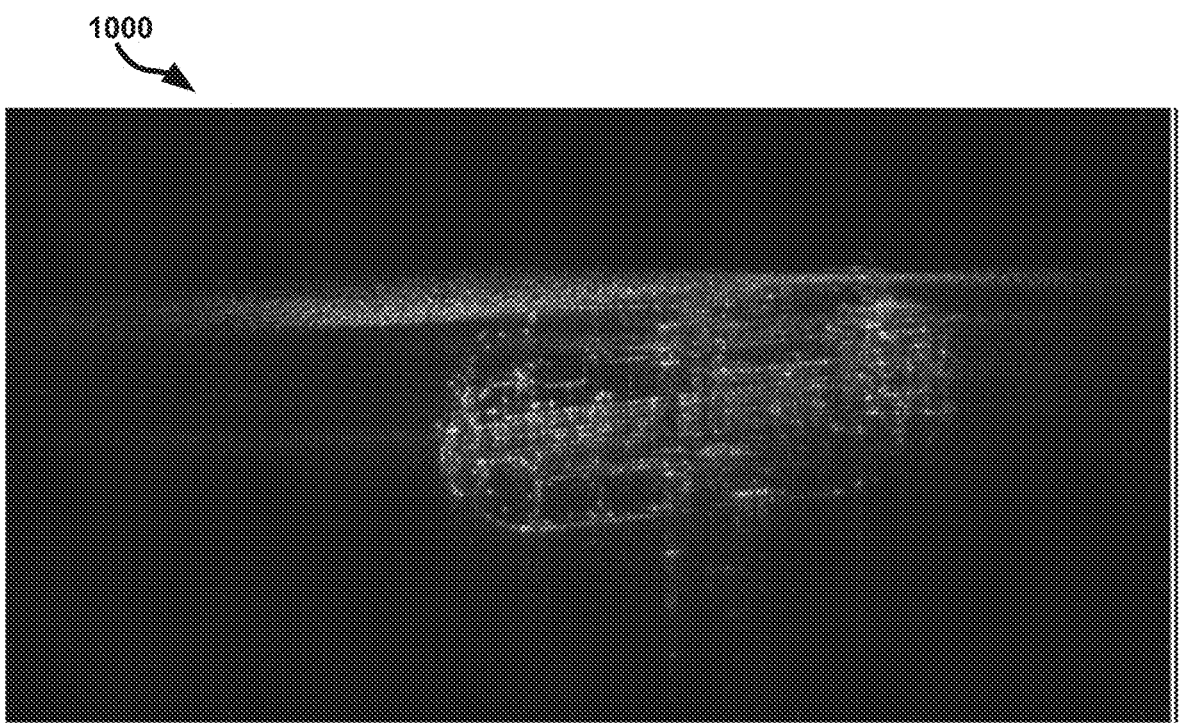

FIG. 7, FIG. 8, FIG. 9, and FIG. 10 illustrate an image at different times along the operation 338. FIG. 7 illustrates an ISAR image 700 before operation 440 is performed. FIG. 8 illustrates an ISAR image 800 that is the ISAR image 700 after the operation 440 is performed thereon. An ISAR image 900 of FIG. 9 includes the image 800 segmented into contiguous, non-overlapping segments 880. The ISAR image 900 is a result of performing operation 550 on the ISAR image 800. An ISAR image 1000 of FIG. 10 includes the image 900 after operation 444 is performed on the image 900.

As can be seen, the image 1000 is significantly clearer, with less blur, than the image 700 before the operation 338 is applied. The improved clarity is due, at least in part, to removing non-linearities in the image 700 that are caused by, at least in part, pitch, roll, or other movement of the object in the image.

Figure 11:
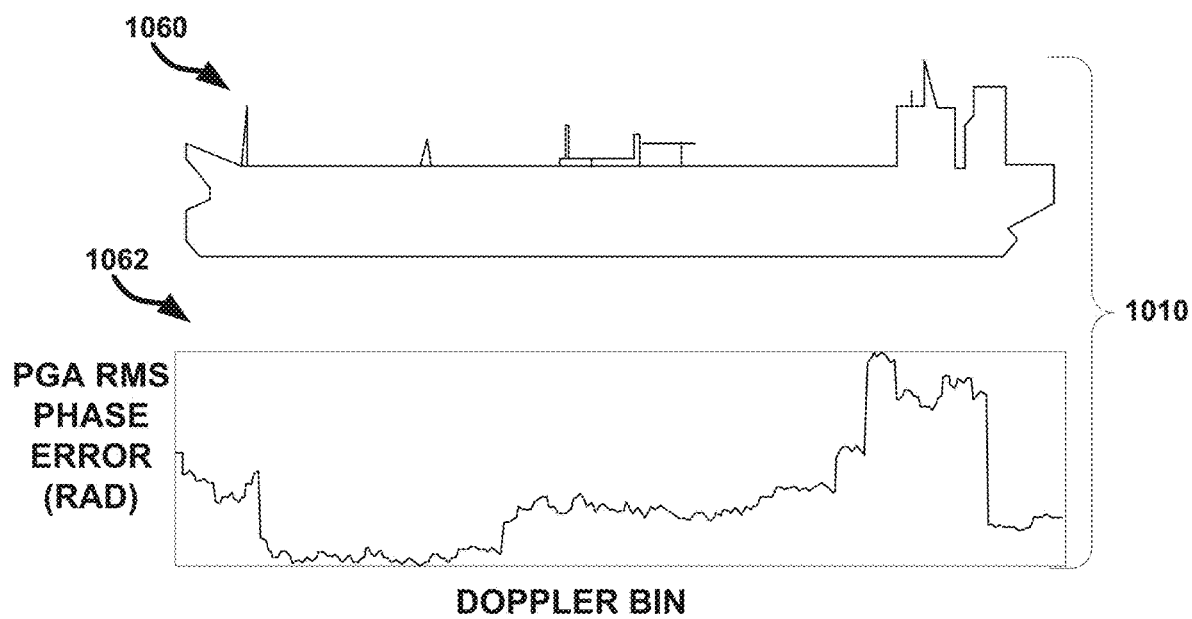
FIG. 11 illustrates, by way of example, a diagram of an embodiment of a comparison of an object and peak ground acceleration (PGA) RMS phase error versus doppler plot of the object.

FIG. 11 illustrates, by way of example, a diagram of an embodiment of a comparison 1010 of an object 1060 and peak ground acceleration (PGA) RMS phase error versus doppler plot 1062 of the object 1060. As can be seen, plotting PGA RMS phase error versus doppler plot 1062 provides an estimate of an outline of the object 1060. The PGA RMS phase error increases with taller points on the object. The plot 1062 can be used, for example, as input to an object recognition technique that can identify the object 1060.

Figure 12:
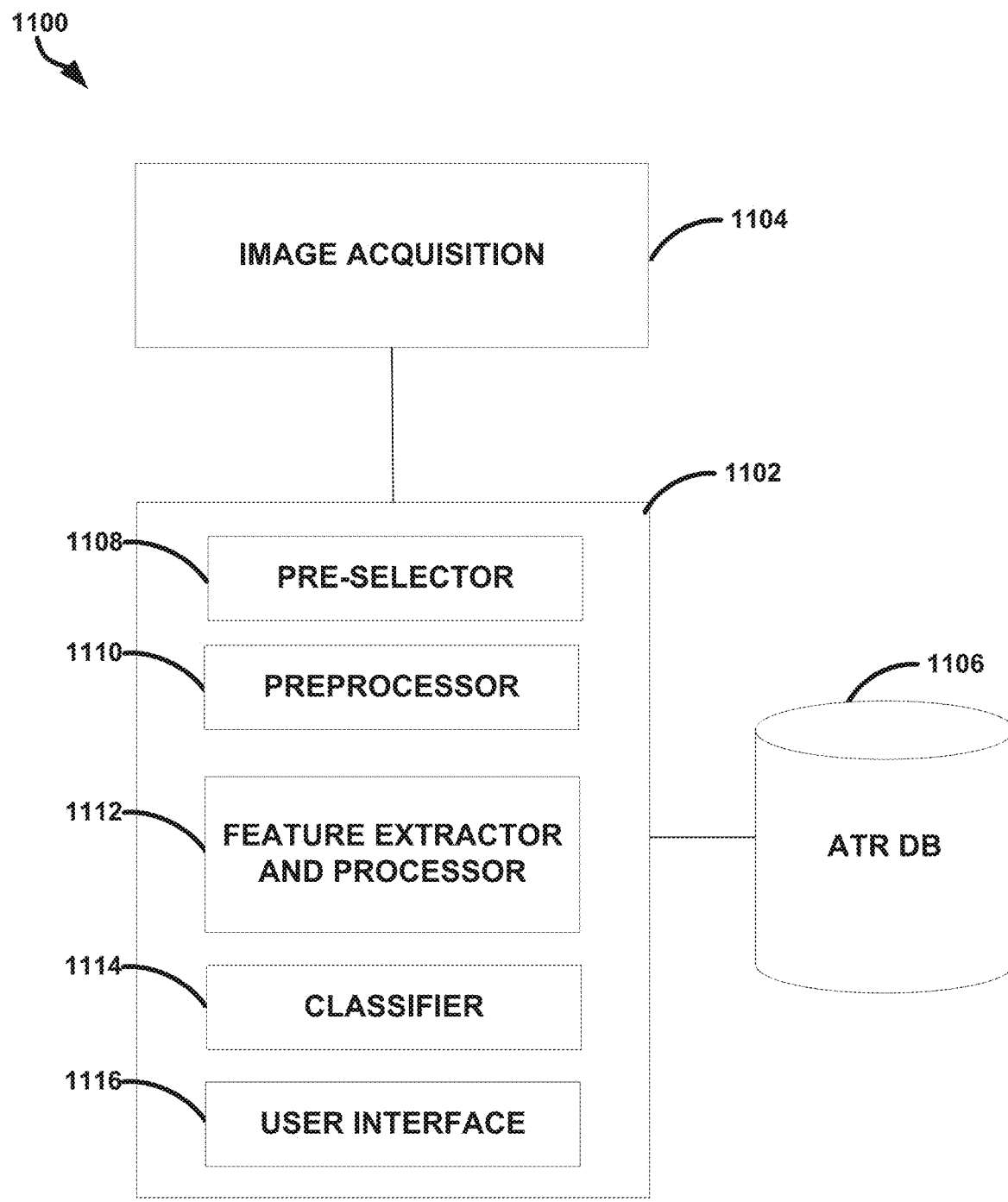
FIG. 12 illustrates, by way of example, a block diagram of an embodiment of an ATR system.

FIG. 12 illustrates, by way of example, a block diagram of an embodiment of an ATR system 1100. The ATR system 1100 as illustrated includes an image acquisition unit 1104, and ATR server 1102, a pre-selector 1108, a preprocessor 1110, feature extractor and processor 1112, a classifier 1114, a user interface 1116, and an AIR database 1106. An AIR processing chain can include a sequence of algorithms that includes preprocessing, feature extraction (for classification or training purposes), and classification.

Image acquisition unit 1104 may interface with and/or include a radar transceiver used to emit radar pulses and/or receive echoes from an illuminated target or terrain. Image acquisition unit 1104 may use any of various spectrum estimation techniques to create image data associated with a target. Unit 1104 may use fast Fourier transform imaging techniques including periodogram or matched filters, a Capon method, APES method, SAMV method, parametric subspace decomposition methods, MUSIC method, Overlapped Sub Aperture (OSA), autofocus, time-domain back projection, and/or frequency-domain back projection among other known techniques. Image acquisition unit 1104 may use variation reduction techniques depending on whether a SAR or ISAR is used to acquire target data (e.g., an image). Unit 1104 may use techniques such as image energy normalization and/or pose rectification in radio frequency (RF) signal processing and image formation. Unit 1104 may apply a polar mapping method for ISAR images. Image acquisition unit 1104 may use various techniques to process raw radar target data to form a human perceivable image of an illuminated target, such as vessel 106 or another object.

Alternatively, image acquisition unit 1104 may process received radar data into a non-perceivable form that is then further processed by, for example, preprocessor 1110 to realize a human perceivable image. Image acquisition unit 1104 may process images and/or image data based on, without limitation, synthetic aperture radar (SAR), inverse synthetic aperture radar (ISAR), laser detection and ranging (LADAR), infrared detection, electro-optical (EO)/infrared (IR) (optical based imagery), and/or hyperspectral radar data.

Preprocessor 1110 may perform some or all of the operations described with respect to image acquisition unit 1104, such as, but not limited to, connecting ship regions, calculating the ship mid-line, splitting the image about the midline, creating a contiguous ship silhouette plot, and dividing the ship into three sections of bow, mid, and stern. Preprocessor 1110 may perform additional processor techniques to further enhance an image, such as the pre-process operation 338, such as, but not limited to, setting the image threshold, blurring the image, identifying and mitigating streaks, and identifying and mitigating whitewater and its effects. Preprocessor 1110 may remove non-linearities from the image, such as by performing the operation 338 or a portion thereof.

Preprocessor 1110 may combine the Doppler image 1000 with the PGA RMS phase error plot 1062 to create a Doppler-weighted phase error image. A two-dimensional image is formed by projecting the sparse 3-D image 1000 onto one of the three respective coordinate planes (e.g., by performing an XY projection, an XZ projection, or a YZ projection). A fourth image can be formed by performing a principal component analysis (PCA) to determine the best planar fit to the 3-D cluster of points in the sparse 3-D image

1000. The PCA results in a plane which is generally oblique to the coordinate planes, and a projection onto which may be a good approximation to the profile presentation of the PGA RMS phase error plot 1062. A viewable image may be formed either by projecting the sparse 3-D image 1000 onto the plane found by PCA, or, equivalently, by rotating the sparse 3-D image 1000 with a rotation which, if applied to the plane found by PCA, would rotate its normal parallel to the Z-axis, and then projecting the rotated sparse 3-D image onto the X-Y plane.

Pre-selector 1108 may receive a designation of an object type from an operator via user interface 1116. In certain implementations, pre-selector 1108 retrieves a portion or subset of target recognition data in database 1106 based on the object type. The object type may include a fundamental characteristic of a class of target such as, without limitation, target LOA axis, target width, target height, target state, target kinematics, target shape, target location, and/or mission context. Target state refers to intrinsically sensed characteristics, such as maneuvering, the presence or absence of fuel barrels, torpedoes, articulation of gantry cranes, jib cranes, masts, guns, and open or closed hatches.

ATR database 1106 may store target recognition data. The ATR database 1106 can include multiple reference features associated with each of multiple reference targets (e.g., object names or identifications that uniquely identify the object).

Feature extractor and processor 1112 may perform feature extraction on the enhanced image 340. The feature extractor and processor 1112 may be configured to compare and/or discriminate features of the object in the image 340. Feature extraction includes calculating geometric feature length, area, perimeter, and centroid per section, identifying the locations corresponding to the start and stop position and width of peaks, troughs, and extent-based features (e.g., masts, kingposts, funnels, deck breaks, etc.), determines the start and stop position and width of super structures, and creates a contiguous ship silhouette profile. Example features include apparent LOA, total number of significant peaks (a.k.a., local "hot spots"), number of peaks per bow, mid, and stem region, distance of the most significant peaks to the bow or aft.

Classifier 1114 may be configured to classify an object based on the feature from the feature extractor and processor 1112. Statistics-based classification compares the extracted geometric features to a database of ship models. Profile-based classification compares the extracted PGA RMS phase error silhouette plot 1062 to a database of ship silhouette plot models, wherein normalized linear correlation is used to calculate the fit of the model to the data. Template-based correlation convolves the Doppler-weighted phase error image with a ship model template to create a weighted score.

Classifier 1114 may combine one or more scores to rank and select the matching ship model using a maximum a posteriori (MAP) estimate. Classifier 1114 can include multiple decision trees that solve the classification problem. The classifier 1114 may use Bayesian networks or directed acyclic graphs (DAG). Classifier 1114 may select the decision tree having the minimal misclassification cost and determine a classification of the acquired target based on the features. Classifier 1114 may generate a classification decision report based on the determined classification of the acquired target in the image. Classifier 1114 may use one or more neural networks, such as multilayer perceptrons (MLPs), convolutional neural networks (CNNs), or deep Boltzmann machines (DBM) that are trained to compute a function that maps the feature to an output vector. The output vector may convey estimates of likelihoods of target classes (objects). In some implementations, classifier 1114 uses a recurrent neural network (RNN) where its neurons send feedback signals to each other to enable dynamic temporal behavior, such as determining whether a given image includes a feature based on one or more past images and the given image. Classifier 1114 may use an enhanced RNN referred to as long short-term memory (LSTM) and/or hierarchal temporal memory (HIM). Classifier 1114 may use fuzzy logic. Classifier 1114 may combine multiple aforementioned algorithms to form a hybrid system. A decision tree is a generic term that describes a decision process that may use one or more attributes at each node and/or use an information theoretic measure to formulate queries at each node. It does not refer to a specific implementation, but may include one or a combination of ID3, C4.5, and/or CART.

User interface 1116 may be arranged to display a classification decision report to an operator. The classification decision report may include a graphical explanation of the determined classification of an acquired target 344. The classification report may include a graphical representation of the decision tree having the minimal misclassification cost as illustrated in decision tree. The classification report may include the extracted features or machine representations of those features, such as the activation values of an NN hidden layer forming a mapping or manifold. In some implementations, classifier 1114 fuses a portion of reference features of the multiple reference features in database 1106 to provide confidence metrics associated with a determined classification of an acquired target in the image.

As explained elsewhere, embodiments are illustrated and described generally using ships as example objects that include features disposed along a length of the ship. Other objects include features disposed along the length thereof. Some example objects and corresponding features include an airplane with features of engine (sub-features jet, prop, turbofan, or the like), fuselage, identification, insignia, rudder, tail, windows, wings, among others; antenna with features of aerial, articulated, dish, rotating, tower, among others; building with features of bunker, columns, doors (sub-features of double, single, rolling), mouldings, roof (sub-features of flat, pitched), window, among others; convoy with features car, dismounts, end vehicle, lead vehicle, truck, tank, among others; foliage with features bushes, grass, shrubs, trees (sub-features of branch, conifer, deciduous, fruit, limb, trunk), among others; gatherings with features assembly, formation, parade, pedestrians (sub-features of cueing, marching, milling, random, tight, walking), sidewalk, sporting, among others; installations with features of artillery, barracks, command, platoon, surface-to-air missile (SAM) (sub-features of command, launcher, radar), among others; land mass with features of bay, continent, littoral, mountain, island, jetty, man-made, among others; space systems with features of launch vehicle; nozzle, satellite (sub-features of communication, E/O, weather), solar panels, among others; unmanned aerial vehicle (UAV) with features of airplane, drone, helicopter, hybrid, multi-rotor, quad, among others; and vehicles with features of antenna, bed, body, cab, engine compartment, fuel container, skirt, turret, wheel, among others. This list of objects (or collections of objects) is not exhaustive and other objects with features that vary in location along the length thereof are applicable to embodiments.

Figure 13:
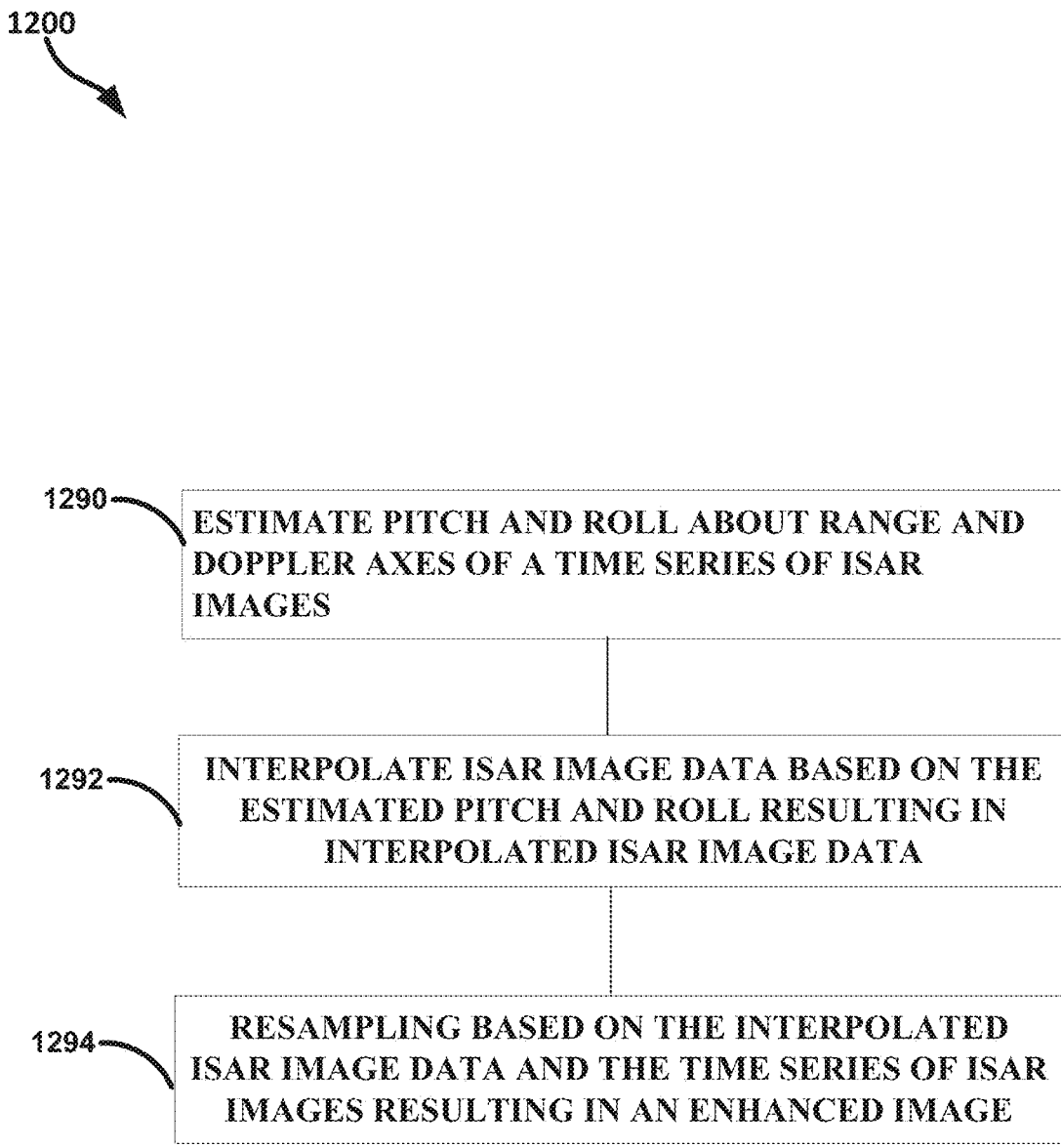
FIG. 13 illustrates, by way of example, a block diagram of an embodiment of a method for enhancing an ISAR image.

FIG. 13 illustrates, by way of example, a block diagram of an embodiment of a method 1200 for enhancing an ISAR image. The method 1200 as illustrated includes estimating pitch and roll about range and doppler axes of a time series of ISAR images including the ISAR image, at operation 1290; interpolating ISAR image data based on the estimated pitch and roll resulting in interpolated ISAR image data, at operation 1292; and resampling based on the interpolated ISAR image data and the time series of ISAR images resulting in an enhanced image, at operation 1294.

The method 1200 can further include, wherein estimating the pitch and roll includes segmenting each of the ISAR images of the time series of ISAR images into segments and estimating the pitch and roll for each segment of the segments. The method 1200 can further include, wherein a size of the segments is determined to minimize blur in the time series of ISAR images. The method 1200 can further include, wherein the size of the segments is iterated until reducing the size of the segments changes an error of a phase gradient less than a specified amount.

The method 1200 can further include, wherein estimating the pitch and roll further includes determining a phase gradient between corresponding segments of consecutive ISAR images of the time series of ISAR images. The method 1200 can further include, wherein interpolating further includes converting the phase gradient to a time. The method 1200 can further include, wherein converting the phase gradient to the time includes determining the time based on a time of an immediately previous iteration, a pulse repetition interval, the phase gradient, and a sensor doppler center.

The method 1200 can further include generating a plot of peak ground acceleration (PGA) root mean square (RMS) error versus doppler bin and performing object recognition based on the plot. The method 1200 can further include, wherein the segments are contiguous and non-overlapping. The method 1200 can further include combining the ISAR image with the PGA RMS phase error plot to create a Doppler-weighted phase error image and performing object recognition based on the Doppler-weighted phase error image.

Figure 14:
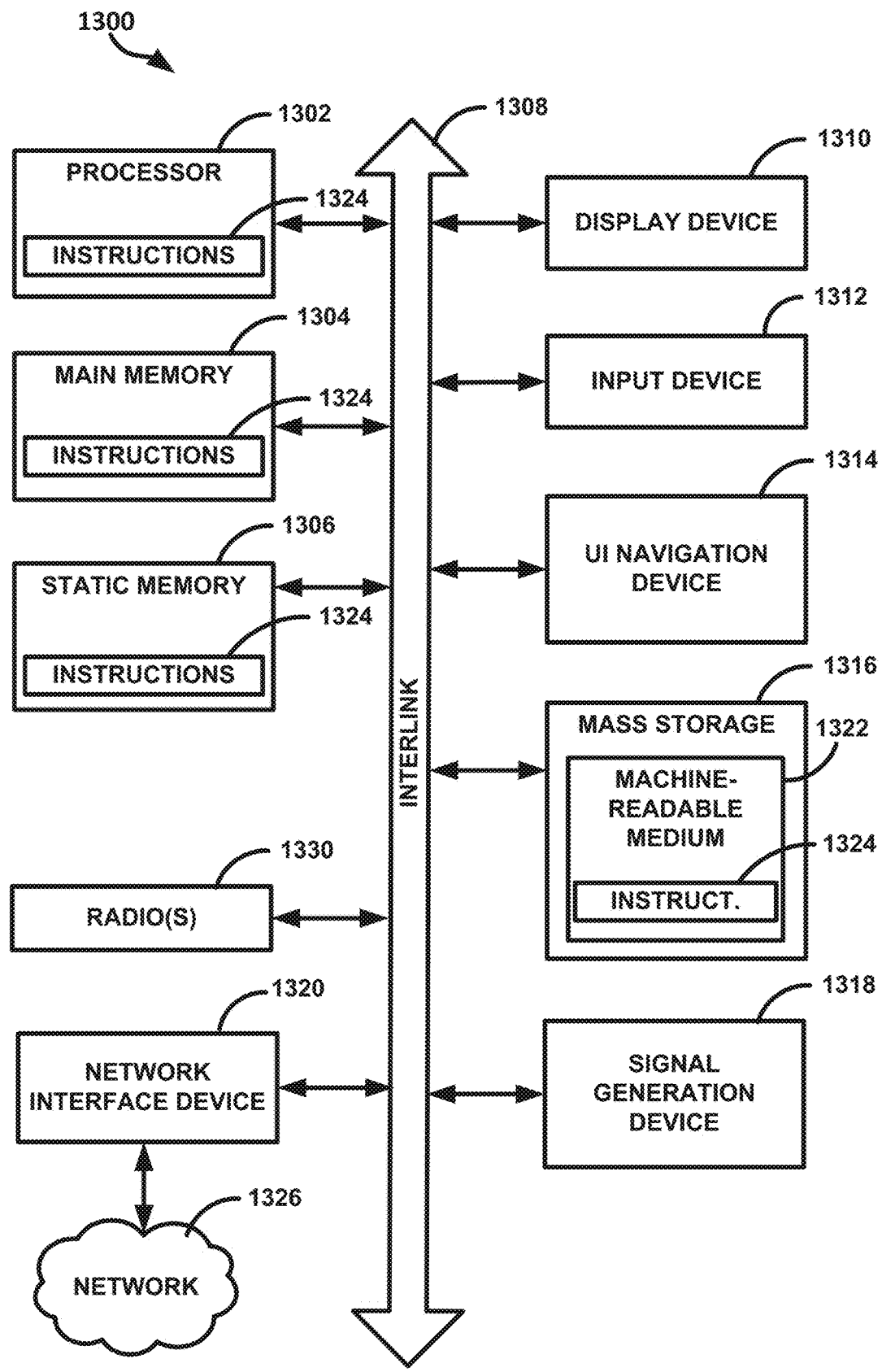
FIG. 14 illustrates, by way of example, a block diagram of an embodiment of a machine in the example form of a computer system within which instructions, for causing the machine to perform any one or more of the methodologies discussed herein, may be executed.

FIG. 14 illustrates, by way of example, a block diagram of an embodiment of a machine in the example form of a computer system 1300 within which instructions, for causing the machine to perform any one or more of the methodologies discussed herein, may be executed. One or more of the aircraft 102, vessel 106, operation 338, operation 342, operation 440, operation 442, operation 444, operation 550, operation 552, operation 554, image acquisition unit 1104, ATR system 1100, ATR server 1102, pre-selector 1108, preprocessor 1110, feature extractor and processor 1112, classifier 1114, user interface 1116, method 1200 or other device, component, operation, or method discussed can include, or be implemented or performed by one or more of the components of the computer system 1300. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (FDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPO or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a mass storage unit 1316, a signal generation device 1318 (e.g., a speaker), a network interface device 1320, and a radio 1330 such as Bluetooth, WWAN, WLAN, and NFC, permitting the application of security controls on such protocols.

The mass storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method for removing non-linearities in an inverse synthetic aperture radar (ISAR) image, the method comprising estimating pitch and roll about range and doppler axes of a time series of ISAR images including the ISAR image, interpolating ISAR image data based on the estimated pitch and roll resulting in interpolated ISAR image data, and resampling based on the interpolated ISAR image data and the time series of ISAR images resulting in an enhanced image.

In Example 2, Example 1 further includes, wherein estimating the pitch and roll includes segmenting each of the ISAR images of the time series of ISAR images into segments and estimating the pitch and roll for each segment of the segments.

In Example 3, Example 2 further includes, wherein a size of the segments is determined to minimize blur in the time series of ISAR images.

In Example 4, Example 3 further includes, wherein the size of the segments is iterated until reducing the size of the segments changes an error of a phase gradient less than a specified amount.

In Example 5, at least one of Examples 2-4 further includes, wherein estimating the pitch and roll further includes determining a phase gradient between corresponding segments of consecutive ISAR images of the time series of ISAR images.

In Example 6, Example 5 further includes, wherein interpolating further includes converting the phase gradient to a time.

In Example 7, Example 6 further includes, wherein converting the phase gradient to the time includes determining the time based on a time of an immediately previous iteration, a pulse repetition interval, the phase gradient, and a sensor doppler center.

In Example 8, at least one of Examples 5-7 further includes generating a plot of peak ground acceleration (PGA) root mean square (RMS) error versus doppler bin and performing object recognition based on the plot.

In Example 9, at least one of Examples 2-8 further includes, wherein the segments are contiguous and non-overlapping.

In Example 10, at least one of Examples 8-9 further includes combining the ISAR image with the PGA RMS phase error plot to create a Doppler-weighted phase error image and performing object recognition based on the Doppler-weighted phase error image.

Example 11 includes a non-transitory machine-readable medium including instructions that, when executed by a machine, cause the machine to perform operations for removing non-linearities in an inverse synthetic aperture radar (ISAR) image, the operations comprising estimating pitch and roll about range and doppler axes of a time series of ISAR images including the ISAR image, interpolating ISAR image data based on the estimated pitch and roll resulting in interpolated ISAR image data, and resampling based on the interpolated ISAR image data and the time series of ISAR images resulting in an enhanced image.

In Example 12, Example 11 further includes, wherein estimating the pitch and roll includes segmenting each of the ISAR images of the time series of ISAR images into segments and estimating the pitch and roll for each segment of the segments.

In Example 13, Example 12 further includes, wherein a size of the segments is determined to minimize blur in the time series of ISAR images.

In Example 14, Example 13 further includes, wherein the size of the segments is iterated until reducing the size of the segments changes an error of a phase gradient less than a specified amount.

In Example 15, at least one of Examples 12-14 further includes, wherein estimating the pitch and roll further includes determining a phase gradient between corresponding segments of consecutive ISAR images of the time series of ISAR images.

In Example 16, at least one of Examples 11-15 further includes performing operations of the method of one of Examples 6-10.

In Example 17 a device includes a memory device including instructions stored thereon, and processing circuitry coupled to the memory device, the processing circuitry configured to execute the instructions, the instructions, when executed by the processing circuitry cause the processing circuitry to perform operations for removing non-linearities in an inverse synthetic aperture radar (ISAR) image, the operations comprising estimating pitch and roll about range and doppler axes of a time series of ISAR images including the ISAR image, interpolating ISAR image data based on the estimated pitch and roll resulting in interpolated ISAR image data, and resampling based on the interpolated ISAR image data and the time series of ISAR images resulting in an enhanced image.

In Example 18, Example 17 further includes, wherein estimating the pitch and roll includes segmenting each of the ISAR images of the time series of ISAR images into segments and estimating the pitch and roll for each segment of the segments, estimating the pitch and roll further includes determining a phase gradient between corresponding segments of consecutive ISAR images of the time series of ISAR image, and interpolating further includes converting the phase gradient to a time.

In Example 19, at least one of Examples 17-18 further includes, wherein converting the phase gradient to the time includes determining the time based on a time of an immediately previous iteration, a pulse repetition interval, the phase gradient, and a sensor doppler center.

In Example 20, at least one of Examples 17-19 further includes generating a plot of peak ground acceleration (PGA) root mean square (RMS) error versus doppler bin and performing object recognition based on the plot.

In Example 21, at least one of Examples 17-20 further includes, wherein the operations further comprise combining the ISAR image with the PGA MS phase error plot to create a Doppler-weighted phase error image and performing object recognition based on the Doppler-weighted phase error image.

In Example 22, at least one of Examples 17-21 further includes the operations of the method of at least one of Examples 2-6.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for removing non-linearities in and object recognition based on an inverse synthetic aperture radar (ISAR) image, the method comprising:
   estimating pitch and roll about range and doppler axes of a time series of ISAR images including the ISAR image;
   interpolating ISAR image data in the time series of images based on the estimated pitch and roll resulting in interpolated ISAR image data;
   resampling based on the interpolated ISAR image data and the time series of ISAR images resulting in enhanced images;
   generating a plot of peak ground acceleration (PGA) root mean square (RMS) error versus doppler bin of the enhanced images; and
   performing object recognition based on the plot.

2. The method of claim 1, wherein estimating the pitch and roll includes segmenting each of the ISAR images of the time series of ISAR images into segments and estimating the pitch and roll for each segment of the segments.

3. The method of claim 2, wherein a size of the segments is determined to minimize blur in the time series of ISAR images.

4. The method of claim 3, wherein the size of the segments is iterated until reducing the size of the segments changes an error of a phase gradient of the segments to be less than a specified amount.

5. The method of claim 2, wherein estimating the pitch and roll further includes determining a phase gradient between corresponding segments of consecutive ISAR images of the time series of ISAR images.

6. The method of claim 5, wherein interpolating further includes converting the phase gradient to a time.

7. The method of claim 6, wherein converting the phase gradient to the time includes determining the time based on a time of an immediately previous iteration, a pulse repetition interval, the phase gradient, and a sensor doppler center.

8. The method of claim 2, wherein the segments are contiguous and non-overlapping.

9. The method of claim 1, further comprising:
   combining the ISAR image with the PGA RMS phase error plot to create a Doppler-weighted phase error image; and
   performing object recognition based on the Doppler-weighted phase error image.

10. A non-transitory machine-readable medium including instructions that, when executed by a machine, cause the machine to perform operations for removing non-linearities in and object recognition based on an inverse synthetic aperture radar (ISAR) image, the operations comprising:
    estimating pitch and roll about range and doppler axes of a time series of ISAR images including the ISAR image;
    interpolating ISAR image data in the time series of images based on the estimated pitch and roll resulting in interpolated ISAR image data;
    resampling based on the interpolated ISAR image data and the time series of ISAR images resulting in enhanced images;
    generating a plot of peak ground acceleration (PGA) root mean square (RMS) error versus doppler bin of the enhanced images; and
    performing object recognition based on the plot.

11. The non-transitory machine-readable medium of claim 10, wherein estimating the pitch and roll includes segmenting each of the ISAR images of the time series of ISAR images into segments and estimating the pitch and roll for each segment of the segments.

12. The non-transitory machine-readable medium of claim 11, wherein a size of the segments is determined to minimize blur in the time series of ISAR images.

13. The non-transitory machine-readable medium of claim 12, wherein the size of the segments is iterated until reducing the size of the segments changes an error of a phase gradient of the segments to be less than a specified amount.

14. The non-transitory machine-readable medium of claim 11, wherein estimating the pitch and roll further includes determining a phase gradient between corresponding segments of consecutive ISAR images of the time series of ISAR images.

15. A device comprising:
    a memory device including instructions stored thereon; and
    processing circuitry coupled to the memory device, the processing circuitry configured to execute the instructions, the instructions, when executed by the processing circuitry cause the processing circuitry to perform operations for removing non-linearities in and object recognition based on an inverse synthetic aperture radar (ISAR) image, the operations comprising:
        estimating pitch and roll about range and doppler axes of a time series of ISAR images including the ISAR image;
        interpolating ISAR image data in the tie series of images based on the estimated pitch and roll resulting in interpolated ISAR image data;
        resampling based on the interpolated ISAR image data and the time series of ISAR images resulting in enhanced images;
        generating a plot of peak ground acceleration (PGA) root mean square (RMS) error versus doppler bin of the enhanced images; and
        performing object recognition based on the plot.

16. The device of claim 15, wherein:
    estimating the pitch and roll includes segmenting each of the ISAR images of the time series of ISAR images into segments and estimating the pitch and roll for each segment of the segments;
    estimating the pitch and roll further includes determining a phase gradient between corresponding segments of consecutive ISAR images of the time series of ISAR image; and
    interpolating further includes converting the phase gradient to a time.

17. The device of claim 16, wherein converting the phase gradient to the time includes determining the time based on a time of an immediately previous iteration, a pulse repetition interval, the phase gradient, and a sensor doppler center.

18. The device of claim 16, wherein the operations further comprise:
    combining the ISAR image with the PGA RMS phase error plot to create a Doppler-weighted phase error image; and
    performing object recognition based on the Doppler-weighted phase error image.

* * * * *